United States Patent
Fang et al.

(10) Patent No.: US 9,110,884 B2
(45) Date of Patent: Aug. 18, 2015

(54) MESSAGE PUBLISHING AND SUBSCRIBING METHOD AND APPARATUS

(71) Applicant: Huawei Technologies Co., Ltd., Shenzhen (CN)

(72) Inventors: Yuan Fang, Shenzhen (CN); Guanjun Tang, Shenzhen (CN); Yunpeng Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/489,743

(22) Filed: Sep. 18, 2014

(65) Prior Publication Data

US 2015/0006555 A1    Jan. 1, 2015

Related U.S. Application Data

(63) Continuation of application No. PCT/CN2013/076631, filed on Jun. 3, 2013.

(51) Int. Cl.
*G06F 17/27*     (2006.01)
*H04L 12/58*     (2006.01)

(52) U.S. Cl.
CPC ............ *G06F 17/2785* (2013.01); *H04L 12/58* (2013.01); *H04L 51/14* (2013.01); *H04L 51/12* (2013.01)

(58) Field of Classification Search
CPC ....... G06F 17/271; H04L 12/58; H04L 51/12; H04L 51/14
USPC .................................. 707/755; 709/206, 238
See application file for complete search history.

(56) References Cited

U.S. PATENT DOCUMENTS

| | | | |
|---|---|---|---|
| 7,103,680 B1 * | 9/2006 | Holdsworth et al. | 709/246 |
| 7,680,900 B2 * | 3/2010 | Duigenan et al. | 709/217 |
| 7,685,265 B1 * | 3/2010 | Nguyen et al. | 709/223 |
| 7,734,723 B2 * | 6/2010 | Bedi et al. | 709/218 |
| 7,853,643 B1 * | 12/2010 | Martinez et al. | 709/203 |
| 8,738,704 B2 * | 5/2014 | Stark et al. | 709/205 |
| 2003/0115317 A1 * | 6/2003 | Hickson et al. | 709/224 |
| 2003/0135556 A1 * | 7/2003 | Holdsworth | 709/206 |
| 2004/0139166 A1 * | 7/2004 | Collison | 709/207 |

(Continued)

FOREIGN PATENT DOCUMENTS

| | | |
|---|---|---|
| CN | 1631016 A | 6/2005 |
| CN | 101061485 A | 10/2007 |

(Continued)

OTHER PUBLICATIONS

Milo et al., "Boosting Topic_Based Publish-Subscribe Systems with Dynamic Clustering", SIGMOD ' 07, Jun. 11-14, 2007, Beijing, China, 12 pages.*

(Continued)

*Primary Examiner* — Phuong Thao Cao
(74) *Attorney, Agent, or Firm* — Conley Rose, P.C.; Grant Rodolph

(57) ABSTRACT

A message publishing and subscribing method and apparatus, which relate to the information processing field and provide higher information transmission efficiency and better flexibility mainly by providing a corresponding dummy topic in a message broker for a publisher and a subscriber or by performing semantic recognition in the message broker for the publisher and the subscriber.

10 Claims, 14 Drawing Sheets

(56) References Cited

U.S. PATENT DOCUMENTS

| | | | |
|---|---|---|---|
| 2004/0250060 A1* | 12/2004 | Diep et al. | 713/155 |
| 2005/0021622 A1* | 1/2005 | Cullen | 709/204 |
| 2005/0021836 A1* | 1/2005 | Reed et al. | 709/238 |
| 2005/0044197 A1* | 2/2005 | Lai | 709/223 |
| 2005/0086469 A1* | 4/2005 | Dunagan et al. | 713/163 |
| 2005/0092825 A1* | 5/2005 | Cox et al. | 235/375 |
| 2006/0047666 A1* | 3/2006 | Bedi et al. | 707/10 |
| 2006/0080596 A1* | 4/2006 | Bhogal et al. | 715/503 |
| 2006/0085507 A1* | 4/2006 | Zhao et al. | 709/206 |
| 2006/0149840 A1* | 7/2006 | Thompson et al. | 709/224 |
| 2006/0168043 A1 | 7/2006 | Eisenberger et al. | |
| 2006/0168070 A1* | 7/2006 | Thompson et al. | 709/206 |
| 2006/0209868 A1* | 9/2006 | Callaghan | 370/428 |
| 2008/0168122 A1* | 7/2008 | Fletcher et al. | 709/201 |
| 2008/0256553 A1* | 10/2008 | Cullen | 719/313 |
| 2009/0089408 A1* | 4/2009 | Bou-Diab et al. | 709/220 |
| 2009/0228563 A1* | 9/2009 | Jones et al. | 709/206 |
| 2009/0265161 A1* | 10/2009 | Fletcher et al. | 704/9 |
| 2010/0067695 A1* | 3/2010 | Liao et al. | 380/255 |
| 2010/0241717 A1* | 9/2010 | Hawkins et al. | 709/206 |
| 2011/0125921 A1* | 5/2011 | Karenos et al. | 709/240 |
| 2011/0145374 A1* | 6/2011 | Lee | 709/220 |
| 2011/0258268 A1 | 10/2011 | Banks et al. | |
| 2011/0289092 A1* | 11/2011 | Kumar et al. | 707/741 |
| 2011/0289163 A1* | 11/2011 | Edwards et al. | 709/206 |
| 2011/0296050 A1* | 12/2011 | Cherukuri | 709/232 |
| 2011/0307603 A1* | 12/2011 | Ishikawa | 709/224 |
| 2012/0030572 A1* | 2/2012 | Karenos et al. | 715/734 |
| 2012/0124127 A1* | 5/2012 | McGrady | 709/203 |
| 2012/0207159 A1* | 8/2012 | Buchko et al. | 370/390 |
| 2012/0233268 A1* | 9/2012 | Bedi et al. | 709/206 |
| 2012/0233272 A1 | 9/2012 | Bedi et al. | |
| 2012/0246337 A1* | 9/2012 | Ross | 709/238 |
| 2012/0290655 A1* | 11/2012 | Jellard | 709/204 |
| 2012/0290656 A1* | 11/2012 | Jellard | 709/204 |
| 2013/0166681 A1 | 6/2013 | Thompson et al. | |
| 2013/0173786 A1 | 7/2013 | Abjanic et al. | |
| 2014/0013236 A1* | 1/2014 | Horsman et al. | 715/744 |
| 2014/0040389 A1* | 2/2014 | BEARDSMORE et al. | 709/206 |
| 2014/0334449 A1* | 11/2014 | Rubin et al. | 370/331 |
| 2014/0335839 A1* | 11/2014 | Rubin et al. | 455/416 |
| 2015/0012551 A1* | 1/2015 | Dong et al. | 707/755 |

FOREIGN PATENT DOCUMENTS

| | | |
|---|---|---|
| CN | 101151604 A | 3/2008 |
| CN | 101960825 A | 1/2011 |
| WO | 2009127481 A1 | 10/2009 |

OTHER PUBLICATIONS

Zieba et al., "Quality-Constrained Routing in Publish/Subscribe Systems", ACM, 2004, 8 pages.*

Zhao et al., "DYNATOPS: A Dynamic Topic-Based Publish/Subscribe Architecture", DEBS '13, Jun. 29-Jul. 3, 2013, Arlington, Texas, USA, 12 pages.*

Li, G. et al "DRScribe: An Improved Topic-Based Publish-Subscribe System with Dynamic Routing", Web-Age Information Management (WAIM) 2011, LNCS 6897, pp. 226-237, 2011.*

Li, J. et al., "Topic-Based Resource Allocation for Real-Time Publish/Subscribe Communication Systems", In Proceedings of the 5th International ICST Conference on Communications and Networking in China (CHINACOM), Aug. 25-27, 2010, IEEE, 9 pages.*

Muhl et al., "Filter Similarities in Content-Based Publish/Subscribe Systems", ARCS 2002, LNCS 2299, pp. 224-238, 2002.*

Xiao et al., "A Real-Time and Reliable Forwarding Scheme of Publish/Subscribe System", In Proceedings of the 2014 Sixth International Conference on Measuring Technology and Mechatronics Automation (ICMTMA), IEEE, pp. 51-54, 2014.*

Foreign Communication From A Counterpart Application, PCT Application No. PCT/CN20131076631, International Search Report dated Mar. 6, 2014, 6 pages.

Foreign Communication From A Counterpart Application, PCT Application No. PCT/CN20131076631, Written Opinion dated Mar. 6, 2014, 5 pages.

Foreign Communication From a Counterpart Application, European Application No. 13876082.2, Extended European Search Report dated Mar. 3, 2015, 8 pages.

Foreign Communication From A Counterpart Application, Chinese Application No. 201380000499.X, Chinese Office Action dated Jun. 3, 2015, 11 pages.

* cited by examiner

MESSAGE PUBLISHING AND SUBSCRIBING METHOD AND APPARATUS

CROSS-REFERENCE TO RELATED APPLICATIONS

This application is a continuation of International Application No. PCT/CN2013/076631, filed on Jun. 3, 2013, which is hereby incorporated by reference in its entirety.

TECHNICAL FIELD

The present invention relates to the information processing field, and in particular, to a message publishing and subscribing method and apparatus.

BACKGROUND

A message broker performs data exchange that is unrelated to a platform using an efficient and reliable message transfer mechanism, and the message broker is capable of expanding communication between processes in a distributed environment using a message transfer and message queuing model.

Among message transmission modes of the message broker, a publish/subscribe mode is a most commonly used transmission mechanism. Information is exchanged between a publisher and a subscriber using a topic, the publisher publishes a message on a related topic, and the subscriber registers on the topic and receives information in the topic. In this manner, the topic connects the publisher and the subscriber.

A message routing manner of a conventional publish/subscribe system is a routing manner based on a combination of content and an address. In such a routing system, firstly, whether messages about a same topic have or do not have interested subscribers, and destination servers and receiving queues for these subscribers are determined according to topic content and with reference to subscribers collected in advance; then, local receiving queues to which these messages are distributed and a next routing node of these messages are determined using a static routing system. Therefore, in such a routing system, a message transmitted between the publisher and the subscriber must carry a topic.

However, changes of a topic, for example, a change of a topic name or category, all affect a routing destination of a message, and the publisher or the subscriber must know these changes so as to publish or subscribe to a message on a correct topic. In a large-scale application scenario, especially in a situation of an Internet environment, such a change leads to a great change of the publisher or the subscriber and an unnecessary network overhead.

SUMMARY

Embodiments of the present invention provide a message publishing and subscribing method and apparatus, so as to provide higher information transmission efficiency and better flexibility.

To achieve the foregoing objective, the embodiments of the present invention adopt the following technical solutions.

In a first aspect, the present invention provides a message publishing method, including obtaining a message that a publisher has sent to a dummy topic corresponding to the publisher; searching for, according to a stored routing rule between a dummy topic and an actual topic, a transmission path with the dummy topic corresponding to the publisher being a start point and a dummy topic corresponding to a random subscriber being an end point, where the dummy topic is configured to forward a message between the actual topic and the publisher or forward a message between the actual topic and the subscriber, and the actual topic is configured to forward a message between the publisher and the subscriber; when the transmission path with the dummy topic corresponding to the publisher being the start point and the dummy topic corresponding to the subscriber being the end point is found, transmitting the message or identification information corresponding to the message on the found transmission path; and when the message or the identification information corresponding to the message is transmitted to an end point of each transmission path, sending the message to a subscriber corresponding to the end point of the transmission path.

With reference to the first aspect, in a first possible implementation manner of the first aspect, the message publishing method further includes when the transmission path with the dummy topic corresponding to the publisher being the start point and the dummy topic corresponding to the subscriber being the end point is not found, performing semantic parsing on the message to obtain a semantic parsing result, and searching for, according to the semantic parsing result, an actual topic that matches the semantic parsing result in stored actual topics; and if the actual topic that matches the semantic parsing result is found, generating and storing a routing rule between the dummy topic corresponding to the publisher and the found actual topic.

With reference to the first possible implementation manner of the first aspect, in a second possible implementation manner, after the generating and storing a routing rule between the dummy topic corresponding to the publisher and the found actual topic, the message publishing method further includes searching for, according to a currently stored routing rule between a dummy topic and an actual topic, the transmission path with the dummy topic corresponding to the publisher being the start point and the dummy topic corresponding to a random subscriber being the end point; when the transmission path with the dummy topic corresponding to the publisher being the start point and the dummy topic corresponding to the subscriber being the end point is found, transmitting the message or the identification information corresponding to the message on the found transmission path; and when the message or the identification information corresponding to the message is transmitted to the end point of each transmission path, sending the message to the subscriber corresponding to the end point of the transmission path.

With reference to the first or the second possible implementation manner of the first aspect, in a third possible implementation manner, the message publishing method further includes, if the actual topic that matches the semantic parsing result is not found, creating a new actual topic, and generating and storing a routing rule between the dummy topic corresponding to the publisher and the newly-created actual topic.

With reference to the first aspect, in a fourth possible implementation manner, before the searching for, according to a currently stored routing rule between a dummy topic and an actual topic, the transmission path with the dummy topic corresponding to the publisher being the start point and the dummy topic corresponding to a random subscriber being the end point, the message publishing method further includes determining whether the obtained message is a control message, where the control message is used to update the stored routing rule between the dummy topic and the actual topic; if the obtained message is not a control message, performing a step of searching for, according to a currently stored routing rule between a dummy topic and an actual topic, the transmission path with the dummy topic corresponding to the publisher being the start point and the dummy topic corresponding to a random subscriber being the end point; and if it is determined that the obtained message is a control message, modifying the stored routing rule between the dummy topic and the actual topic according to the control message, and storing the modified routing rule between the dummy topic and the actual topic.

With reference to the first aspect or any one of the first four possible implementation manners, in a fifth possible implementation manner, before the transmitting the message or identification information corresponding to the message on the found transmission path, the message publishing method further includes generating the identification information corresponding to the message; when the identification information corresponding to the message is transmitted to the end point of each transmission path, sending the message sent by the publisher to the subscriber corresponding to the end point of the transmission path includes, when the identification information of the message is transmitted to the end point of each transmission path, obtaining the message corresponding to the identification information, and sending the message corresponding to the identification information to the subscriber corresponding to the end point of the transmission path.

In a second aspect, the present invention provides a message publishing method, including obtaining a message sent by a publisher; performing semantic parsing on the obtained message, and searching for, according to a semantic parsing result, an actual topic that matches the semantic parsing result in stored actual topics; if the actual topic that matches the semantic parsing result is found, searching for a subscriber corresponding to the actual topic in a stored subscription correspondence; and if the subscriber corresponding to the actual topic is found, sending the obtained message to all found subscribers.

With reference to the second aspect, in a first possible implementation manner, the message publishing method further includes, if the actual topic that matches the semantic parsing result is not found, creating a new actual topic, and storing the newly-created actual topic.

In a third aspect, the present invention provides a message subscribing method, including obtaining a message that a subscriber has sent to a dummy topic corresponding to the subscriber; and creating, according to the obtained message, a routing rule between the dummy topic corresponding to the subscriber and a target actual topic, and the target actual topic is an actual topic that is currently subscribed to by the subscriber, where the dummy topic is configured to forward a message between the actual topic and a publisher or forward a message between the actual topic and the subscriber, and the target actual topic is configured to forward a message between dummy topics corresponding to the subscriber.

With reference to the third aspect, in a first possible implementation manner, the creating, according to the obtained message, a routing rule between the dummy topic corresponding to the subscriber and a target actual topic includes, when the obtained message is a control message, obtaining the target actual topic according to the control message, where the control message is used to update a routing rule between the dummy topic and an actual topic that is selected by the subscriber; and creating a routing rule between the dummy topic corresponding to the subscriber and the target actual topic that is obtained according to the control message.

With reference to the first possible implementation manner of the third aspect, in a second possible implementation manner, the creating, according to the obtained message, a routing rule between the dummy topic corresponding to the subscriber and a target actual topic includes, when the obtained message is not a control message, performing semantic parsing on the obtained message, and searching for, according to a semantic parsing result, an actual topic that matches the semantic parsing result in stored actual topics; and if the actual topic that matches the semantic parsing result is found in the stored actual topics, creating a routing rule between the dummy topic corresponding to the subscriber and the found actual topic that matches the semantic parsing result.

With reference to the second possible implementation manner of the third aspect, in a third possible implementation manner, the message subscribing method further includes, if the actual topic that matches the semantic parsing result is not found in the stored actual topics, creating a new actual topic, and creating the routing rule between the dummy topic corresponding to the subscriber and the target actual topic.

In a fourth aspect, the present invention provides a message subscribing method, including obtaining a message that a subscriber has sent to a dummy topic corresponding to the subscriber; performing semantic parsing on the obtained message, and searching for, according to a semantic parsing result, an actual topic that matches the semantic parsing result in stored actual topics; and if the actual topic that matches the semantic parsing result is found in the stored actual topics, creating a subscription correspondence between the found actual topic and the subscriber.

With reference to the fourth aspect, in a first possible implementation manner, the message subscribing method further includes, if the actual topic that matches the semantic parsing result is not found in the stored actual topics, creating a new actual topic, and creating a subscription correspondence between the newly-created actual topic and the subscriber.

In a fifth aspect, the present invention provides a message publishing apparatus, including an information processing module configured to obtain a message that a publisher has sent to a dummy topic corresponding to the publisher; a topic module configured to search for, according to a stored routing rule between a dummy topic and an actual topic, a transmission path with the dummy topic corresponding to the publisher being a start point and a dummy topic corresponding to a random subscriber being an end point, where the dummy topic is configured to forward a message between the actual topic and the publisher or forward a message between the actual topic and the subscriber, and the actual topic is configured to forward a message between the publisher and the subscriber; and a transmission module configured to, when the topic module finds the transmission path with the dummy topic corresponding to the publisher being the start point and the dummy topic corresponding to the subscriber being the end point, transmit the message or identification information corresponding to the message on the found transmission path; and when the message or the identification information corresponding to the message is transmitted to an end point of each transmission path, send the message to a subscriber corresponding to the end point of the transmission path.

With reference to the fifth aspect, in a first possible implementation manner of the fifth aspect, the message publishing apparatus further includes a semantic recognition module configured to, when the topic module does not find the transmission path with the dummy topic corresponding to the publisher being the start point and the dummy topic corresponding to the subscriber being the end point, perform semantic parsing on the message to obtain a semantic parsing result, and search for, according to the semantic parsing result, an actual topic that matches the semantic parsing result in stored actual topics; and a routing rule generating module configured to, if the semantic recognition module finds the actual topic that matches the semantic parsing result, generate and store a routing rule between the dummy topic corresponding to the publisher and the found actual topic.

With reference to the first possible implementation manner of the first aspect, in a second possible implementation manner, the topic module is configured to search for, according to a routing rule currently stored in the routing rule generating module between a dummy topic and an actual topic, the transmission path with the dummy topic corresponding to the publisher being the start point and the dummy topic corresponding to a random subscriber being the end point; and the transmission module is further configured to, when the topic module finds the transmission path with the dummy topic corresponding to the publisher being the start point and the dummy topic corresponding to the subscriber being the end point, transmit the message or the identification information corresponding to the message on the found transmission path; and when the message or the identification information corresponding to the message is transmitted to the end point of each transmission path, send the message to the subscriber corresponding to the end point of the transmission path.

With reference to the fifth or the second possible implementation manner, in a third possible implementation manner, the topic module is further configured to create a new actual topic when the actual topic that matches the semantic parsing result is not found; and the routing rule generating module is further configured to store a routing rule between the dummy topic corresponding to the publisher and the newly-created actual topic.

With reference to the fifth aspect, in a third possible implementation manner, the information processing module is further configured to determine whether the obtained message is a control message, where the control message is used to update the stored routing rule between the dummy topic and the actual topic; the topic module is configured to, if the information processing module determines that the obtained message is not a control message, search for, according to the currently stored routing rule between the dummy topic and the actual topic, the transmission path with the dummy topic corresponding to the publisher being the start point and the dummy topic corresponding to a random subscriber being the end point; and the routing rule generating module is further configured to, if the information processing module determines that the obtained message is a control message, modify the stored routing rule between the dummy topic and the actual topic according to the control message, and store the modified routing rule between the dummy topic and the actual topic.

With reference to the fifth aspect or any one of the first third possible implementation manners of the fifth aspect, in a fourth possible implementation manner, the information processing module is further configured to generate the identification information corresponding to the message; and the transmission module is further configured to, when the identification information corresponding to the message is transmitted to the end point of each transmission path, obtain the message corresponding to the identification information, and send the message corresponding to the identification information to the subscriber corresponding to the end point of the transmission path.

In a sixth aspect, the present invention provides a message publishing apparatus, including an obtaining module configured to obtain a message sent by a publisher; a semantic recognition module configured to perform semantic parsing on the obtained message, and search for, according to a semantic parsing result, an actual topic that matches the semantic parsing result in stored actual topics; a topic module configured to, when the actual topic that matches the semantic parsing result is found, search for a subscriber corresponding to the actual topic in a stored subscription correspondence; and a transmission module configured to, when the subscriber corresponding to the actual topic is found, send the obtained message to all found subscribers.

With reference to the sixth aspect, in a first possible implementation manner, the topic module is further configured to, when the actual topic that matches the semantic parsing result is not found, create a new actual topic, and store the newly-created actual topic.

In a seventh aspect, the present invention provides a message subscribing apparatus, including an obtaining module configured to obtain a message that a subscriber has sent to a dummy topic corresponding to the subscriber; and a creating module configured to create, according to the obtained message, a routing rule between the dummy topic corresponding to the subscriber and a target actual topic, and the target actual topic is an actual topic that is currently subscribed to by the subscriber, where the dummy topic is configured to forward a message between the actual topic and a publisher or forward a message between the actual topic and the subscriber, and the target actual topic is configured to forward a message between dummy topics corresponding to the subscriber.

With reference to the seventh aspect, in a first possible implementation manner, the creating module includes a first topic submodule configured to, when the obtained message is a control message, obtain the target actual topic according to the control message, where the control message is used to update a routing rule between the dummy topic and an actual topic that is selected by the subscriber; and a routing rule generating module configured to update a routing rule between the dummy topic corresponding to the subscriber and the target actual topic that is obtained according to the control message.

With reference to the seventh aspect, in a second possible implementation manner, the first topic submodule is further configured to, when the obtained message is not a control message, perform semantic parsing on the obtained message, and search for, according to a semantic parsing result, an actual topic that matches the semantic parsing result in stored actual topics; and when the actual topic that matches the semantic parsing result is found in the stored actual topics, use the found actual topic as the target actual topic.

With reference to the second possible implementation manner of the seventh aspect, in a third possible implementation manner, the second topic submodule is further configured to, when the actual topic that matches the semantic parsing result is not found in the stored actual topics, create a new actual topic, and create the routing rule between the dummy topic corresponding to the subscriber and the target actual topic.

In an eighth aspect, the present invention provides a message subscribing apparatus, including an obtaining module configured to obtain a message sent by a subscriber; a semantic recognition module configured to perform semantic parsing on the obtained message, and search for, according to a semantic parsing result, an actual topic that matches the semantic parsing result in stored actual topics; and a topic module configured to, when the actual topic that matches the semantic parsing result is found in the stored actual topics, create a subscription correspondence between the found actual topic and the subscriber.

With reference to the eighth aspect, in a first possible implementation manner, the topic module is further configured to, when the actual topic that matches the semantic parsing result is not found in the stored actual topics, create a new actual topic, and create a subscription correspondence between the newly-created actual topic and the subscriber.

The message publishing and subscribing method provided by the embodiments of the present invention still ensures that a message is correctly transmitted by setting a corresponding dummy topic in a message broker for a publisher and a subscriber, or by performing semantic recognition in the message broker for the publisher and the subscriber in a situation in which the publisher and the subscriber do not need to know a specific structure of an actual topic. Compared with a technical solution in the prior art, in which when a topic of the message broker changes, the publisher and the subscriber must know a result of the change and actively modify a routing rule to complete data transmission, the technical solutions provided by the embodiments of the present invention have higher information transmission efficiency and better flexibility.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Composition block diagrams of two message brokers provided by the embodiments of the present invention are used to implement message publishing and subscribing methods provided by the embodiments of the present invention. A message broker generally exists in a form of software that is capable of running between an operating system and application software, and is configured to perform information transmission between multiple operating systems, between multiple pieces of application software, and between an operating system and application software.

Figure 1:
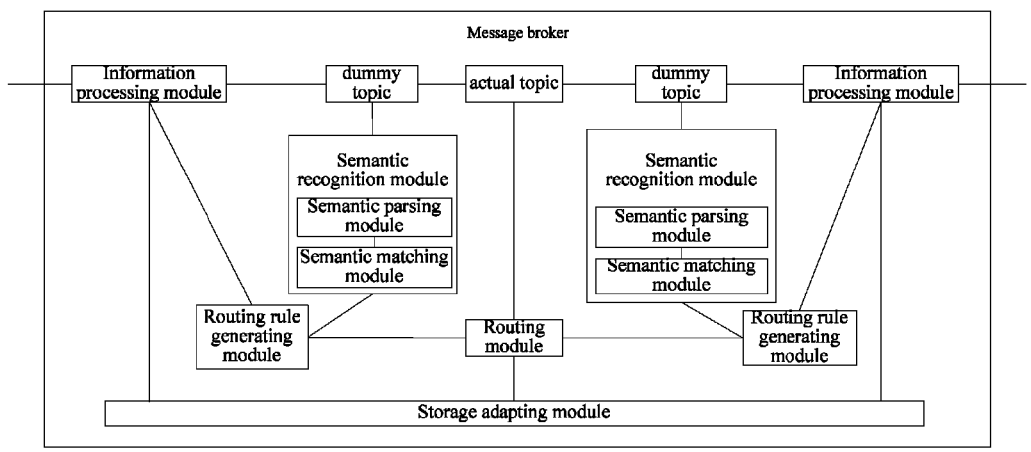
FIG. 1 is a composition block diagram of a message broker according to an embodiment of the present invention.

FIG. 1 is a composition block diagram of an implementation manner of a message broker provided by an embodiment of the present invention. In this structure, a corresponding dummy topic is provided separately for each publisher and each subscriber outside the message broker. The dummy topic functions equivalently as a mapping device of the publisher or the subscriber in the message broker, and has functions of searching for an actual topic of a next hop and message forwarding. Further, the dummy topic is configured to forward a message between the actual topic and the publisher or forward a message between the actual topic and the subscriber.

An information processing module is provided both between the dummy topic and the publisher and between the dummy topic and the subscriber, where the information processing module is mainly configured to recognize a message that the publisher or the subscriber sends to the message broker, and generate identification information corresponding to the message that the publisher or the subscriber sends to the message broker.

The information processing module is further connected to a routing rule generating module and a storage adapting module. The routing rule generating module is configured to generate a routing rule between the dummy topic and the actual topic, and the storage adapting module is configured to store the message that the publisher or the subscriber sends to the message broker.

The routing rule generating module and the storage adapting module are both connected to a routing module, and the routing module is configured to store the routing rule between the dummy topic and the actual topic.

The message broker is further provided with an actual topic, where the actual topic establishes, according to the routing rule between the dummy topic and the actual topic, a logical connection with several dummy topics, and has functions of searching for the actual topic of the next hop or a dummy topic of the next hop and message forwarding. Further, the actual topic is configured to forward a message between a dummy topic corresponding to the publisher and a dummy topic corresponding to the subscriber, and the actual topic is also connected to the routing module. A structure of the actual topic may adopt a tree structure commonly used in the prior art, and may also adopt another structure, which is not limited in this embodiment of the present invention.

The message broker is further provided with a semantic recognition module composed of a semantic parsing module and a semantic matching module, where the semantic recognition module is connected to the dummy topic, the routing rule generating module, and a storage adapter.

Figure 2:
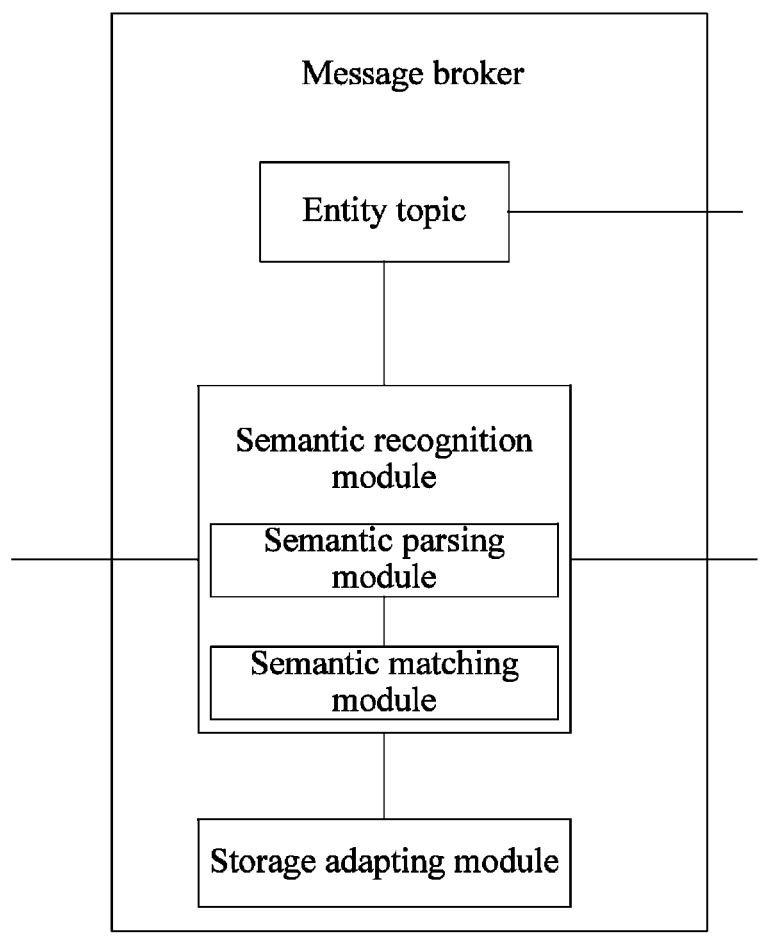
FIG. 2 is a composition block diagram of another message broker according to an embodiment of the present invention.

FIG. 2 is a composition block diagram of another implementation manner of a message broker provided by an embodiment of the present invention. In this structure, the message broker has only an actual topic, a semantic recognition module composed of a semantic parsing module and a semantic matching module, and a storage adapter, where the actual topic is connected to a subscriber outside the message broker and the semantic recognition module, and the semantic recognition module may be connected to the actual topic, the subscriber outside the message broker, a publisher outside the message broker, and the storage adapter. A function of each module is basically the same as a function of the module shown in FIG. 1.

Figure 3:
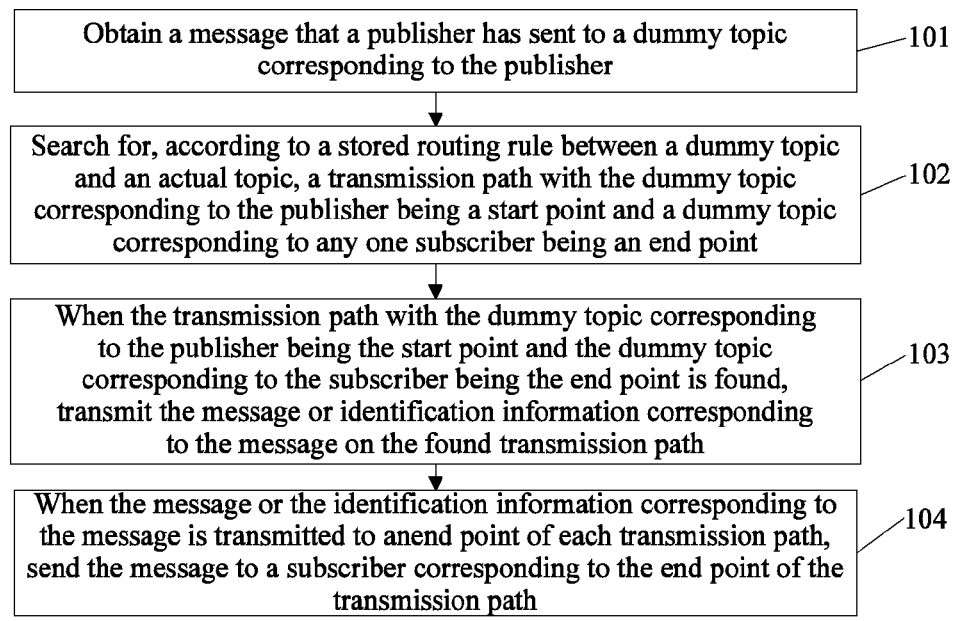
FIG. 3 is a flowchart of a message publishing method according to an embodiment of the present invention.

Based on an message broker shown in FIG. 1, an embodiment of the present invention provides a message subscribing method, as shown in FIG. 3, which includes the following steps:

101. Obtain a message that a publisher has sent to a dummy topic corresponding to the publisher.

The publisher and a subscriber to be described subsequently are generally a user terminal device such as a mobile phone, a personal computer (PC), or a server.

102. Search for, according to a stored routing rule between a dummy topic and an actual topic, a transmission path with the dummy topic corresponding to the publisher being a start point and a dummy topic corresponding to a random subscriber being an end point.

The stored routing rule between the dummy topic and the actual topic is used to indicate a message transmission relationship between the dummy topic and the actual topic, and may be set in advance by the publisher, the subscriber, or a network administrator, or is updated in real time when the message broker is working.

103. When the transmission path with the dummy topic corresponding to the publisher being the start point and the dummy topic corresponding to the subscriber being the end point is found, transmit the message or identification information corresponding to the message on the found transmission path.

The identification information may be unique identification information that the message broker allocates for the message sent by the publisher, and an allocation method may be using multiple methods such as systematic arrangement numbering and hash calculation numbering. In this case, the message sent by the publisher generally needs to be stored in an independent memory device, for example, a storage adapter provided by this embodiment of the present invention. The identification information is mainly used to enable the dummy topic corresponding to the subscriber to obtain the message according to the identification information.

104. When the message or the identification information corresponding to the message is transmitted to an end point of each transmission path, send the message to a subscriber corresponding to the end point of the transmission path.

This embodiment of the present invention provides a message publishing method, and in this method, a publisher may send, according to his or her own needs, a message to a dummy topic corresponding to the publisher in a message broker, and then the message broker may send the message sent by the publisher to a corresponding subscriber according to a transmission path corresponding to a routing rule, which is stored inside the message broker, between the dummy topic and an actual topic, so that when the actual topic changes, it only requires the routing rule between the dummy topic and the actual topic, which is stored inside the message broker, to be modified, and the publisher may still continue to send a message to the dummy topic corresponding to the publisher in the message broker without making any change. Compared with a technical solution, in the prior art, in which when the actual topic changes, the publisher must modify the transmission path to correctly transmit a message, the message publishing method provided by the present invention has higher message transmission efficiency and better transmission path flexibility.

Figure 4:
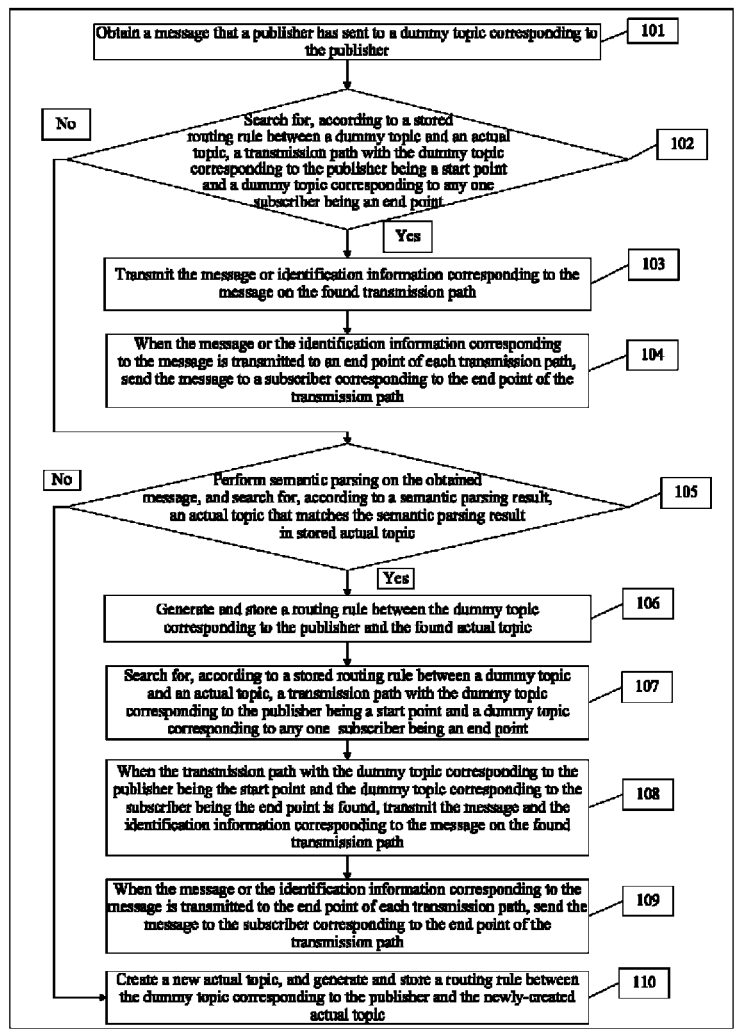
FIG. 4 is a flowchart of another message publishing method according to an embodiment of the present invention.

Further, based on a method flow shown in FIG. 3, an embodiment of the present invention further provides another message publishing method, as shown in FIG. 4, which is implemented after step 102 and includes the following steps.

105. When the transmission path with the dummy topic corresponding to the publisher being the start point and the dummy topic corresponding to the subscriber being the end point is not found, perform semantic parsing on the message, and search for, according to a semantic parsing result, an actual topic that matches the semantic parsing result in stored actual topics. If the actual topic that matches the semantic parsing result is found, perform step 106. If the actual topic that matches the semantic parsing result is not found, perform step 110.

The actual topic is an actual topic that is configured to connect a message publisher and subscriber, and a defining manner of the actual topic is basically the same as that in the prior art; therefore, generally, each actual topic has a corresponding topic identifier, such as a character string and a number, that may be used for text or semantic matching, and after semantic parsing is performed on the message sent by the publisher, the message is parsed into a series of keywords. Fuzzy matching, for example, character string matching, may be performed between the message and topic identifiers respectively corresponding to all actual topics using these keywords, so as to determine a most possible transmission direction or path for the message.

106. Generate and store a routing rule between the dummy topic corresponding to the publisher and the found actual topic.

107. Search for, according to the currently stored routing rule between the dummy topic and the actual topic, the transmission path with the dummy topic corresponding to the publisher being the start point and the dummy topic corresponding to a random subscriber being the end point.

108. When the transmission path with the dummy topic corresponding to the publisher being the start point and the dummy topic corresponding to the subscriber being the end point is found, transmit the message or the identification information corresponding to the message on the found transmission path.

It should be noted that if the transmission path with the dummy topic corresponding to the publisher being the start point and the dummy topic corresponding to the subscriber being the end point is still not found at this time, it indicates that the found actual topic has not been subscribed to at this time. Therefore, the message sent by the publisher can be directly stored, with no need of continuing the sending.

109. When the message or the identification information corresponding to the message is transmitted to the end point of each transmission path, send the message to the subscriber corresponding to the end point of the transmission path.

110. Create a new actual topic, and generate and store a routing rule between the dummy topic corresponding to the publisher and the newly-created actual topic.

After step 110 is performed, it is not required to continue transmitting the message, and a reason is that, if the actual topic corresponding to the message sent by the publisher does not exist in the stored actual topics, it indicates that no subscriber has subscribed to the topic at this time.

In a message publishing method further provided by this embodiment of the present invention, when a corresponding transmission path fails to be found, semantic recognition is performed on a message sent by a publisher, so as to match an actual topic that is the most similar with the message, thereby establishing a brand-new data transmission path to ensure normal and accurate message publishing. Further, the publisher is allowed to send a message completely according to his or her own needs. All message brokers are capable of enabling the message to be correctly transmitted.

Further, to facilitate a publisher to control a message transmission path, an embodiment of the present invention provides a control message for the publisher, which is used to modify and delete an original routing rule stored in the message broker or add a new routing rule. The control message may include a Forward instruction, a Copy instruction, a Subscription instruction, and a Proxy instruction. The Forward instruction is used to control the routing rule to be completely migrated from a topic to another topic in the same message broker, and the original topic will no longer obtain any message. The Copy instruction is not only used to ensure that the original topic that obtains the message still obtains the message, but also serves as a topic of a message source to establish a routing rule with other multiple topics designated by the instruction. The Subscription instruction is used to establish a routing rule between the dummy topic corresponding to the subscriber and the actual topic. The Proxy instruction is used to completely migrate the routing rule from one topic to another topic in a different message broker, and the original topic will no longer obtain any message.

Figure 5:
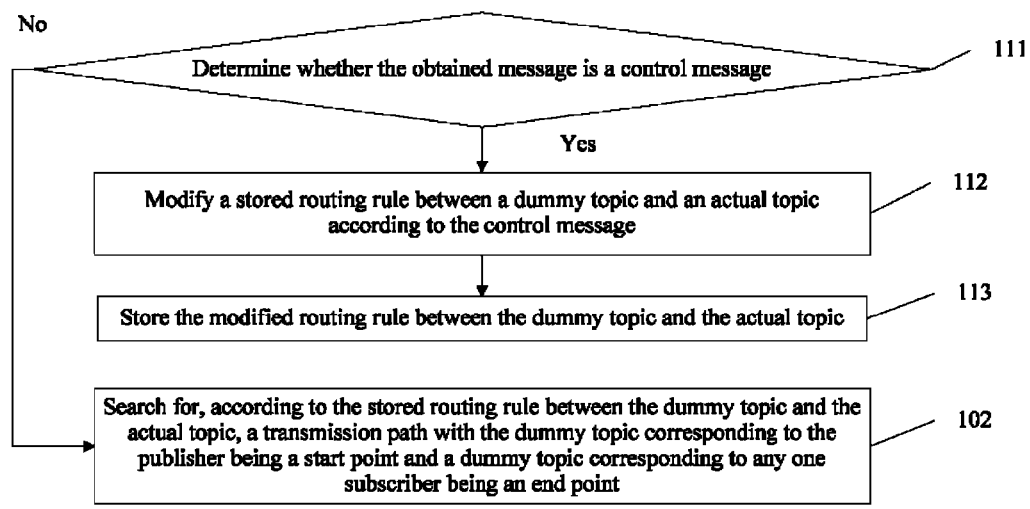
FIG. 5 is a flowchart of another message publishing method according to an embodiment of the present invention.

Based on this, before step 102 is performed, as shown in FIG. 5, the message publishing method further includes the following steps.

111. Determine whether the obtained message is a control message. If it is determined that the obtained message is not a control message, perform step 102. If it is determined that the obtained message is a control message, perform step 112.

112. Modify the stored routing rule between the dummy topic and the actual topic according to the control message.

The control message includes at least the foregoing four instructions: the Forward instruction, the Copy instruction, the Subscription instruction, and the Proxy instruction.

113. Store the modified routing rule between the dummy topic and the actual topic.

The message publishing method further provided by this embodiment of the present invention may provide a subscriber with a function of dynamically controlling a message broker, and further ensure accurate message transmission.

To reduce message transmission traffic in the message broker and save transmission resources, the inside of the message broker may not transmit a message sent by the publisher, but instead, generate a piece of identification information for each message and transmit the identification information. For details, reference may be made to the method flow shown in FIG. 6, which includes the following steps.

S101. Obtain a message that a publisher has sent to a dummy topic corresponding to the publisher.

S102. Generate identification information corresponding to the message.

S103. Search for, according to a stored routing rule between a dummy topic and an actual topic, a transmission path with the dummy topic corresponding to the publisher being a start point and a dummy topic corresponding to a random subscriber being an end point;

S104. When the transmission path with the dummy topic corresponding to the publisher being the start point and the dummy topic corresponding to the subscriber being the end point is found, transmit the identification information on the found transmission path.

S105. When the identification information corresponding to the message is transmitted to an end point of each transmission path, obtain the message corresponding to the identification information.

S106. Send the message to a subscriber corresponding to the end point of the transmission path.

Figure 6:
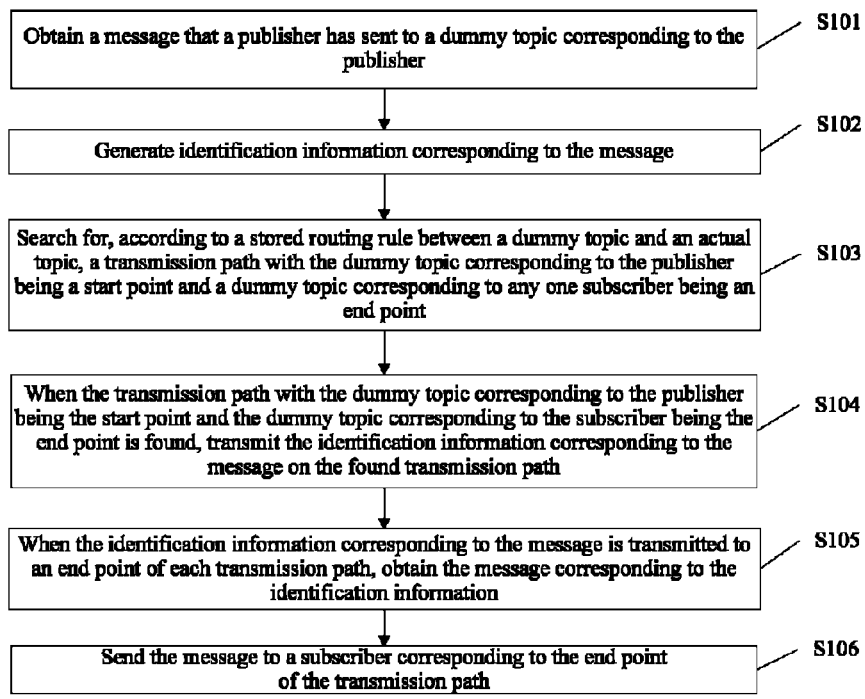
FIG. 6 is a flowchart of another message publishing method according to an embodiment of the present invention.
Figure 7:
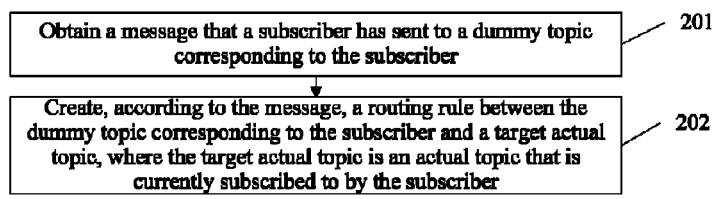
FIG. 7 is a flowchart of a message subscribing method according to an embodiment of the present invention.

In response to a flow of a message publishing method shown in FIG. 3 to FIG. 6, an embodiment of the present invention provides a corresponding message subscribing method, as shown in FIG. 7, which includes the following steps:

201. Obtain a message that a subscriber has sent to a dummy topic corresponding to the subscriber.

The message sent by the subscriber includes a control message and a fuzzy message. The control message is a message sent by a subscriber to a message broker when the subscriber clearly knows which topic or which topics he or she wants to subscribe to, whereas the fuzzy message is a message, such as a text, sent by a subscriber when the subscriber does not know which topic or which topics content that he or she wants to subscribe to belongs to.

202. Create, according to the obtained message, a routing rule between the dummy topic corresponding to the subscriber and a target actual topic, where the target actual topic is an actual topic that is currently subscribed to by the subscriber.

The description of generation and maintenance of a routing rule is similar with content described in the foregoing.

It should be noted that, according to a type of the message obtained in step 201, step 202 also has two different implementation manners, which are as follows.

Figure 8:
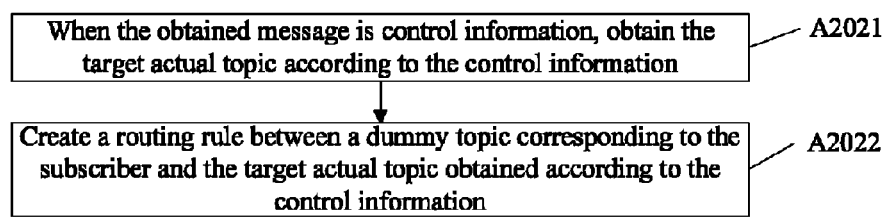
FIG. 8 is a flowchart of another message subscribing method according to an embodiment of the present invention.

An implementation manner 1 shown in FIG. 8 includes the following steps.

A2021. When the obtained message is a control message, obtain the target actual topic according to the control message.

The control message and the control message described in step 111 implement different functions of a same instruction type.

A2022. Create a routing rule between the dummy topic corresponding to the subscriber and the target actual topic obtained according to the control message.

Figure 9:
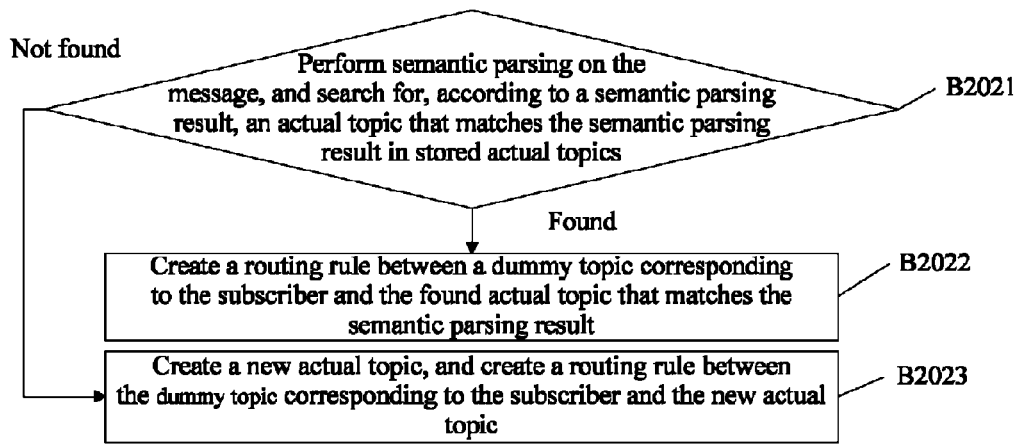
FIG. 9 is a flowchart of another message subscribing method according to an embodiment of the present invention.

An implementation manner 2 shown in FIG. 9 includes the following steps.

B2021. When the obtained message is not a control message, perform semantic parsing on the obtained message, and search for, according to a semantic parsing result, an actual topic that matches the semantic parsing result in stored actual topics. If the actual topic that matches the semantic parsing result is found in the stored actual topics, perform step B2022. If the actual topic that matches the semantic parsing result is not found in the stored actual topics, perform step B2023.

B2022. Create a routing rule between the dummy topic corresponding to the subscriber and the found actual topic that matches the semantic parsing result.

B2023. Create a new actual topic, and create a routing rule between the dummy topic corresponding to the publisher and the new actual topic.

In the message subscribing method provided by this embodiment of the present invention, a subscriber only needs to establish a routing rule between a dummy topic corresponding to the subscriber and a target actual topic, and subsequently, when the actual topic changes, it only requires that a message broker change the routing rule, and the subscriber may still continue receiving the message from a corresponding dummy topic without making any change. Compared with a technical solution, in the prior art, in which when the actual topic changes, the subscriber must modify the transmission path to correctly receive a desired message, the message subscribing method provided by this embodiment of the present invention has higher message transmission efficiency and better transmission path flexibility.

In addition, the subscriber may perform subscription using a control message or a fuzzy message according to his or her own needs, which increases flexibility for the subscriber.

Figure 10:
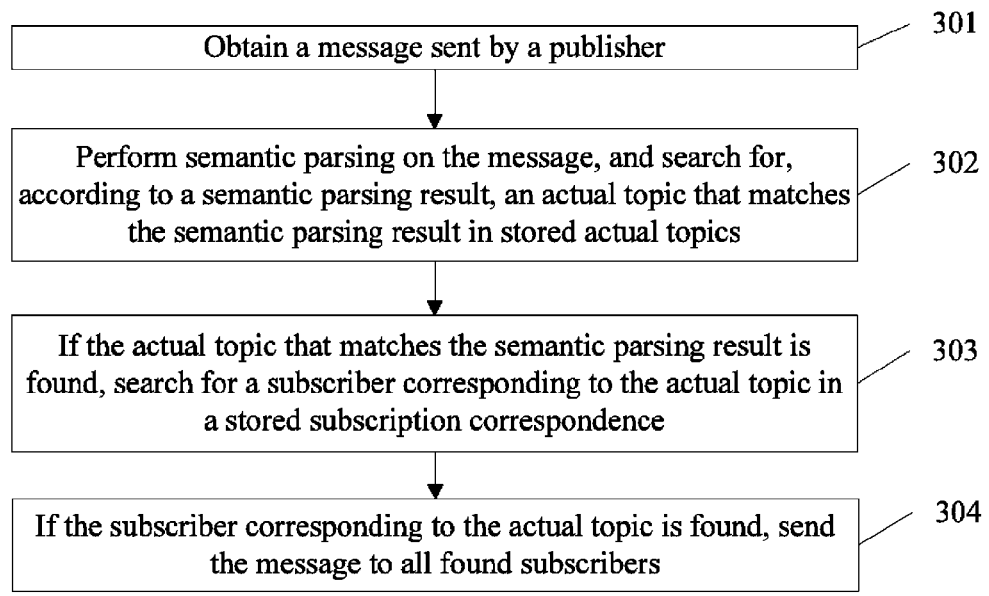
FIG. 10 is a flowchart of a message publishing method according to an embodiment of the present invention.

Based on an information broker shown in FIG. 2, an embodiment of the present invention provides a message publishing method, as shown in FIG. 10, which includes the following steps.

301. Obtain a message sent by a publisher.

302. Perform semantic parsing on the obtained message, and search for, according to a semantic parsing result, an actual topic that matches the semantic parsing result in stored actual topics.

303. If the actual topic that matches the semantic parsing result is found, search for a subscriber corresponding to the actual topic in a stored subscription correspondence.

For a matching method based on the semantic parsing result, reference may be made to related description in step 105.

304. If the subscriber corresponding to the actual topic is found, send the obtained message to all found subscribers.

Figure 11:
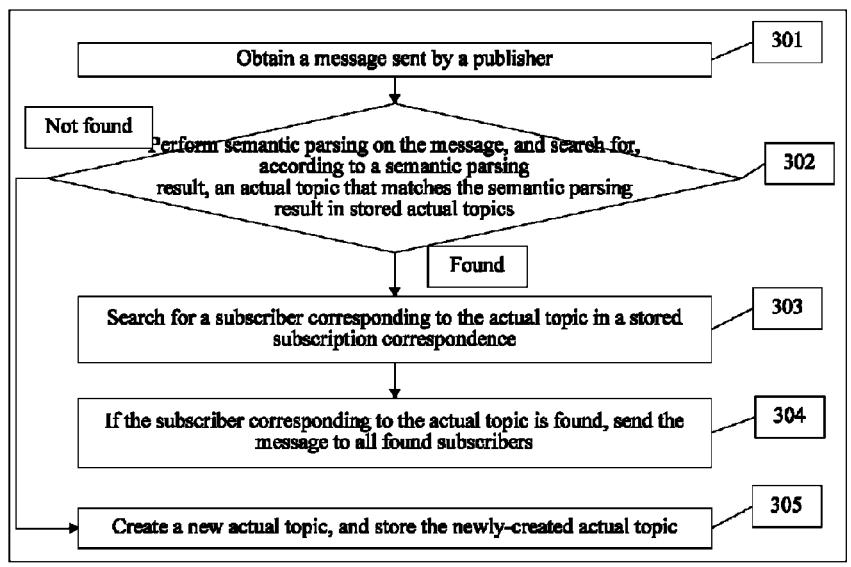
FIG. 11 is a flowchart of another message publishing method according to an embodiment of the present invention.

In addition, as shown in FIG. 11, if the actual topic that matches the semantic parsing result is not found after step 302 is performed, perform 305, create a new actual topic, and store the newly-created actual topic.

The message publishing method provided by this embodiment of the present invention may be used on the Internet, especially in a scenario of some fields of the mobile Internet in which a publisher or a subscriber may possibly not care about what a specific topic is or whether a topic exists. This method may perform semantic parsing directly according to a message sent by the publisher to infer a topic that the publisher possibly wants to publish, so that the publisher publishes the message according to his or her own needs, thereby improving efficiency and flexibility of message transmission.

Figure 12:
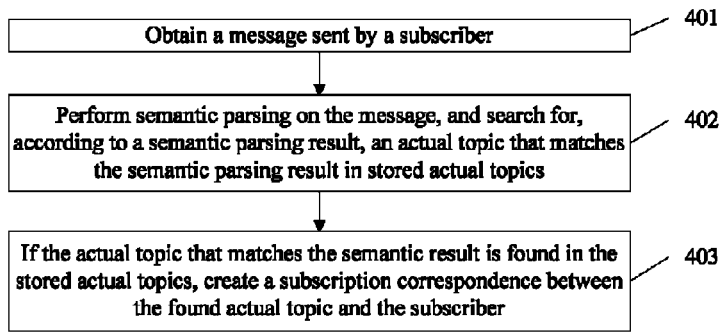
FIG. 12 is a flowchart of another message subscribing method according to an embodiment of the present invention.

In response to a flow of a message publishing method shown in FIG. 10 to FIG. 11, an embodiment of the present invention provides a corresponding message subscribing method, as shown in FIG. 12, which includes the following steps:

401. Obtain a message sent by a subscriber.

402. Perform semantic parsing on the obtained message, and search for, according to a semantic parsing result, an actual topic that matches the semantic parsing result in stored actual topics.

403. If the actual topic that matches the semantic parsing result is found in the stored actual topics, create a subscription correspondence between the found actual topic and the subscriber.

Figure 13:
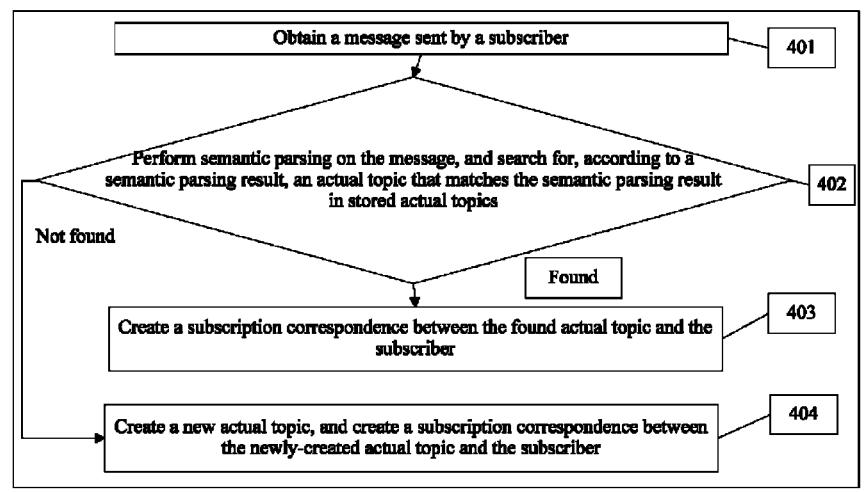
FIG. 13 is a flowchart of another message subscribing method according to an embodiment of the present invention.

In addition, as shown in FIG. 13, if the actual topic that matches the semantic parsing result is not found after step 402 is performed, perform 404, create a new actual topic, and create a subscription correspondence between the newly-created actual topic and the subscriber.

The message subscribing method provided by this embodiment of the present invention may be used on the Internet, especially in a scenario of some fields of the mobile Internet in which a publisher or a subscriber may possibly not care about what a specific topic is or whether a topic exists. This method may perform semantic parsing directly according to a message sent by the subscriber to infer a topic that the subscriber possibly wants to subscribe to, so that the subscriber subscribes to the message according to his or her own needs, with no need of knowing what a specific topic is, thereby improving efficiency and flexibility of message transmission.

Further, it should be noted that an apparatus structure shown in FIG. 2 includes an actual topic, which is set for a purpose of consolidating and classifying multiple messages into a same topic. However, in some special application scenarios, such as Microblog and WeChat, no explicit division exists between a publisher and a subscriber, each user end may be a message publisher and obtainer, and sent messages are difficult to be classified due to a huge quantity. Therefore, in such a scenario, the messages do not need to be consolidated and classified, that is, a matching module may be set in the apparatus structure shown in FIG. 2 to replace the original actual topic, so as to perform semantic matching on different messages that a user end sends to a message broker and transmit messages of multiple user ends that are successfully matched between the user ends.

Figure 14:
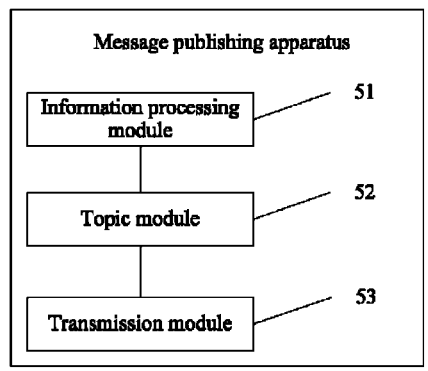
FIG. 14 is a composition block diagram of a message publishing apparatus according to an embodiment of the present invention.

The present invention provides a message publishing apparatus, which may be used to implement a flow of a message publishing method shown in FIG. 3 to FIG. 6, as shown in FIG. 14, including an information processing module 51 configured to obtain a message that a publisher has sent to a dummy topic corresponding to the publisher; a topic module 52 configured to search for, according to a stored routing rule between a dummy topic and an actual topic, a transmission path with the dummy topic corresponding to the publisher being a start point and a dummy topic corresponding to a random subscriber being an end point, where the dummy topic is configured to forward a message between the actual topic and the publisher or forward a message between the actual topic and the subscriber, and the actual topic is configured to forward a message between the publisher and the subscriber; and a transmission module 53 configured to, when the topic module 52 finds the transmission path with the dummy topic corresponding to the publisher being the start point and the dummy topic corresponding to the subscriber being the end point, transmit the message or identification information corresponding to the message on the found transmission path; and when the message or the identification information corresponding to the message is transmitted to an end point of each transmission path, send the message to a subscriber corresponding to the end point of the transmission path, where the identification information is used to enable the dummy topic corresponding to the subscriber to obtain the message according to the identification information.

Figure 15:
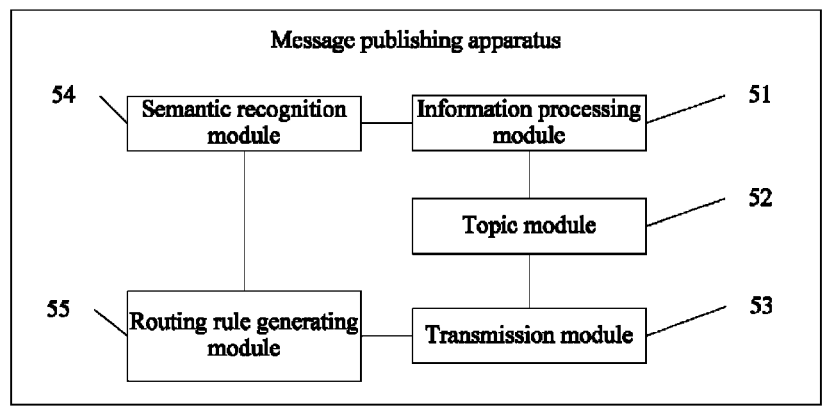
FIG. 15 is a composition block diagram of another message publishing apparatus according to an embodiment of the present invention.

Optionally, as shown in FIG. 15, the apparatus further includes a semantic recognition module 54 configured to, when the topic module 52 does not find the transmission path with the dummy topic corresponding to the publisher being the start point and the dummy topic corresponding to the subscriber being the end point, perform semantic parsing on the message to obtain a semantic parsing result, and search for, according to the semantic parsing result, an actual topic that matches the semantic parsing result in stored actual topics; and a routing rule generating module 55 configured to, if the semantic recognition module 54 finds the actual topic that matches the semantic parsing result, generate and store a routing rule between the dummy topic corresponding to the publisher and the found actual topic.

Optionally, the topic module 52 is configured to search for, according to a routing rule currently stored in the routing rule generating module 55 between a dummy topic and an actual topic, the transmission path with the dummy topic corresponding to the publisher being the start point and the dummy topic corresponding to a random subscriber being the end point; and the transmission module 53 is further configured to, when the topic module 52 finds the transmission path with the dummy topic corresponding to the publisher being the start point and the dummy topic corresponding to the subscriber being the end point, transmit the message or the identification information corresponding to the message on the found transmission path; and when the message or the identification information corresponding to the message is transmitted to the end point of each transmission path, send the message to the subscriber corresponding to the end point of the transmission path.

Optionally, the topic module 52 is further configured to create a new actual topic when the actual topic that matches the semantic parsing result is not found; and the routing rule generating module 55 is further configured to store a routing rule between the dummy topic corresponding to the publisher and the newly-created actual topic.

Optionally, the information processing module 51 is further configured to determine whether the obtained message is a control message, where the control message is used to update the stored routing rule between the dummy topic and the actual topic; the topic module 52 is configured to, if the information processing module 51 determines that the obtained message is not a control message, search for, according to the currently stored routing rule between the dummy topic and the actual topic, the transmission path with the dummy topic corresponding to the publisher being the start point and the dummy topic corresponding to a random subscriber being the end point; and the routing rule generating module 55 is further configured to, if the information processing module 52 determines that the obtained message is a control message, modify the stored routing rule between the dummy topic and the actual topic according to the control message, and store the modified routing rule between the dummy topic and the actual topic.

Optionally, the information processing module 51 is further configured to generate the identification information corresponding to the message; and the transmission module 53 is further configured to, when the identification information corresponding to the message is transmitted to the end point of each transmission path, obtain the message corresponding to the identification information, and send the message corresponding to the identification information to the subscriber corresponding to the end point of the transmission path.

Figure 16:
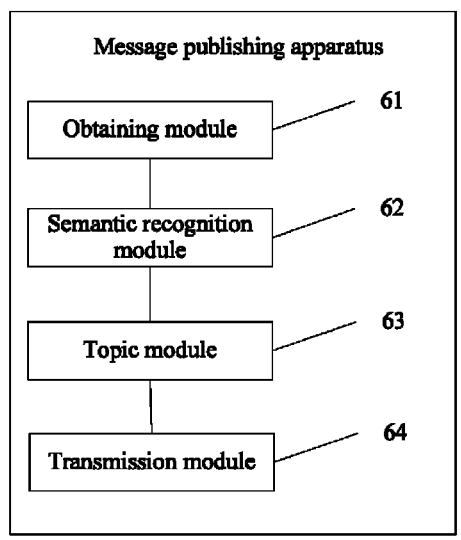
FIG. 16 is a composition block diagram of another message publishing apparatus according to an embodiment of the present invention.

An embodiment of the present invention provides a message publishing apparatus, which may be used to implement a flow of a message publishing method shown in FIG. 9 and FIG. 10, as shown in FIG. 16, and the apparatus includes an obtaining module 61 configured to obtain a message sent by a publisher; a semantic recognition module 62 configured to perform semantic parsing on the obtained message, and search for, according to a semantic parsing result, an actual topic that matches the semantic parsing result in stored actual topics; a topic module 63 configured to, when the actual topic that matches the semantic parsing result is found, search for a subscriber corresponding to the actual topic in a stored subscription correspondence; and a transmission module 64 configured to, when the subscriber corresponding to the actual topic is found, send the obtained message to all found subscribers.

Optionally, the topic module 63 is further configured to, when the actual topic that matches the semantic parsing result is not found, create a new actual topic, and store the newly-created actual topic.

Figure 17:
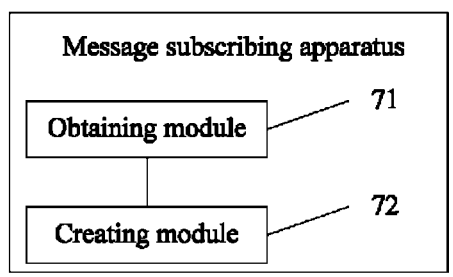
FIG. 17 is a composition block diagram of another message subscribing apparatus according to an embodiment of the present invention.

An embodiment of the present invention provides a message subscribing apparatus, which may be used to implement a flow of a message subscribing method shown in FIG. 6 to FIG. 8, as shown in FIG. 17, and the apparatus includes an obtaining module 71 configured to obtain a message that a subscriber has sent to a dummy topic corresponding to the subscriber; and a creating module 72 configured to create, according to the obtained message, a routing rule between the dummy topic corresponding to the subscriber and a target actual topic, and the target actual topic is an actual topic that is currently subscribed to by the subscriber, where the dummy topic is configured to forward a message between the actual topic and a publisher or forward a message between the actual topic and the subscriber, and the target actual topic is configured to forward a message between dummy topics corresponding to the subscriber.

Figure 18:
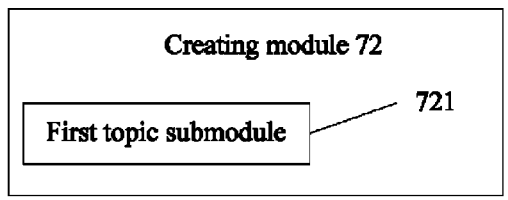
FIG. 18 is a composition block diagram of another message subscribing apparatus according to an embodiment of the present invention.

Optionally, as shown in FIG. 18, the creating module 72 includes a first topic submodule 721 configured to, when the obtained message is a control message, obtain the target actual topic according to the control message, where the control message is used to update a routing rule between the dummy topic and an actual topic that is selected by the subscriber, and configured to update a routing rule between the dummy topic corresponding to the subscriber and the target actual topic that is obtained according to the control message.

Figure 19:
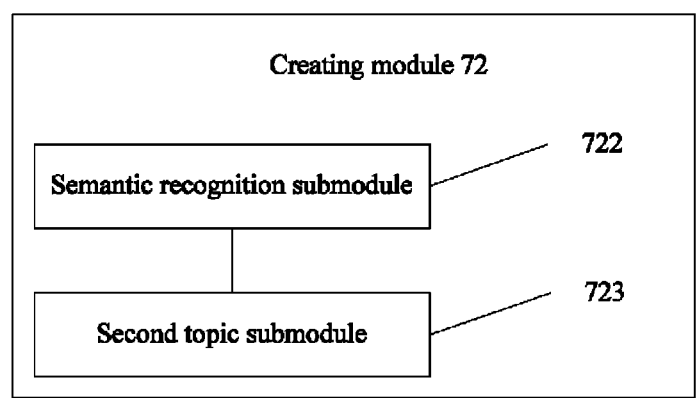
FIG. 19 is a composition block diagram of another message subscribing apparatus according to an embodiment of the present invention.

Optionally, as shown in FIG. 19, the creating module 72 includes a semantic recognition submodule 722 configured to, when the obtained message is not a control message, perform semantic parsing on the obtained message, and search for, according to a semantic parsing result, an actual topic that matches the semantic parsing result in stored actual topics; and a second topic submodule 723 configured to, when the actual topic that matches the semantic parsing result is found in the stored actual topics, use the found actual topic as the target actual topic, and create a routing rule between the dummy topic corresponding to the subscriber and the found actual topic that matches the semantic parsing result.

Optionally, the second topic submodule 723 is further configured to, when the actual topic that matches the semantic parsing result is not found in the stored actual topics, create a new actual topic, and create the routing rule between the dummy topic corresponding to the subscriber and the target actual topic.

Figure 20:
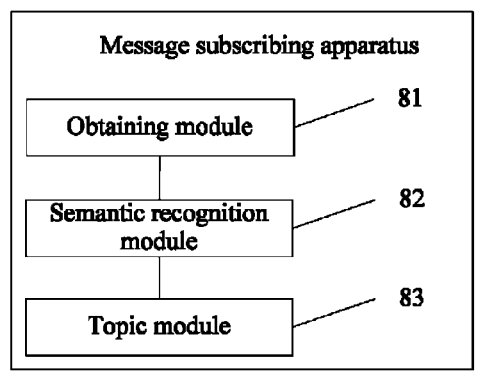
FIG. 20 is a composition block diagram of another message subscribing apparatus according to an embodiment of the present invention.

An embodiment of the present invention further provides a message subscribing apparatus, which may be used to implement a flow of a message subscribing method shown in FIG. 11 and FIG. 12, as shown in FIG. 20, and the apparatus includes an obtaining module 81 configured to obtain a message sent by a subscriber; a semantic recognition module 82 configured to perform semantic parsing on the obtained message, and search for, according to a semantic parsing result, an actual topic that matches the semantic parsing result in stored actual topics; and a topic module 83 configured to, when the actual topic that matches the semantic parsing result is found in the stored actual topics, create a subscription correspondence between the found actual topic and the subscriber.

Optionally, the topic module 83 is further configured to, when the actual topic that matches the semantic parsing result is not found in the stored actual topics, create a new actual topic, and create a subscription correspondence between the newly-created actual topic and the subscriber.

The message publishing and subscribing apparatus provided by the embodiments of the present invention still ensures that a message is correctly transmitted by setting a corresponding dummy topic in a message broker for a publisher and a subscriber, or by performing semantic recognition in the message broker for the publisher and the subscriber in a situation in which the publisher and the subscriber do not need to know a specific structure of an actual topic. Compared with a technical solution, in the prior art, in which when a topic in the message broker changes, the publisher and the subscriber must know a result of the change and actively modify a routing rule to complete data transmission, the technical solutions provided by the embodiments of the present invention have higher message transmission efficiency and better flexibility.

Figure 21:
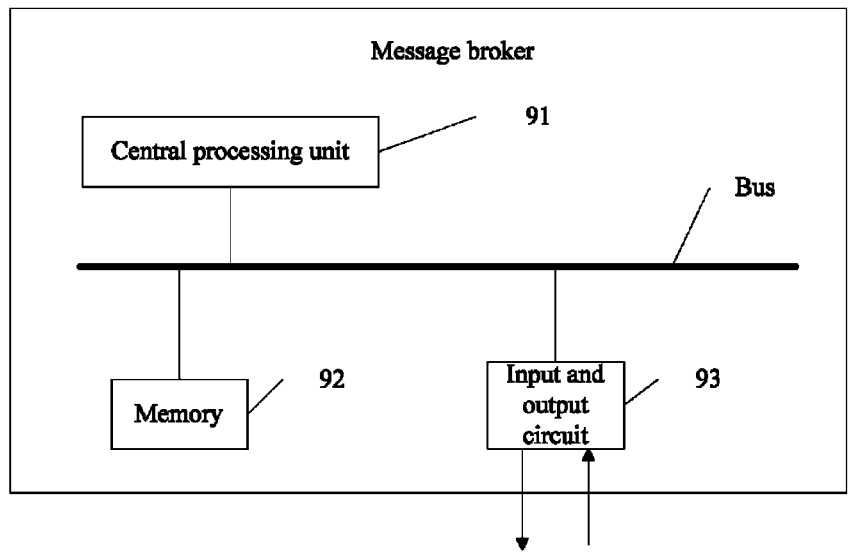
FIG. 21 is a composition block diagram of another message broker according to an embodiment of the present invention.

An embodiment of the present invention provides a message broker, as shown in FIG. 21, which includes at least a processor 91, a memory 92, and an input and output circuit 93. The memory 92 is configured with programming code, and the processor 91 is configured to invoke the programming code in the memory 92 to implement a flow of a message publishing and subscribing method shown in FIG. 3 to FIG. 8. The memory 92 communicates with the processor 91 using a bus.

The input and output circuit 93 is configured to obtain a message that a publisher has sent to a dummy topic corresponding to the publisher; when a transmission path with the dummy topic corresponding to the publisher being a start point and a dummy topic corresponding to a subscriber being an end point is found, transmit the message or identification information corresponding to the message on the found transmission path; and when the message or the identification information corresponding to the message is transmitted to an end point of each transmission path, send the message to a subscriber corresponding to the end point of the transmission path, where the identification information is used to enable the dummy topic corresponding to the subscriber to obtain the message according to the identification information.

The processor 91 is configured to search for, according to a stored routing rule between a dummy topic and an actual topic, a transmission path with the dummy topic corresponding to the publisher being the start point and a dummy topic corresponding to a random subscriber being the end point, where the dummy topic is configured to forward a message between the actual topic and the publisher or forward a message between the actual topic and the subscriber, and the actual topic is configured to forward a message between the publisher and the subscriber.

The memory 92 is configured to store the routing rule between the dummy topic and the actual topic.

The processor 91 is further configured to, when the transmission path with the dummy topic corresponding to the publisher being the start point and the dummy topic corresponding to the subscriber being the end point is not found, perform semantic parsing on the message to obtain a semantic parsing result, and search for, according to the semantic parsing result, an actual topic that matches the semantic parsing result in stored actual topics; and if the actual topic that matches the semantic parsing result is found, generate and store a routing rule between the dummy topic corresponding to the publisher and the found actual topic.

The processor 91 is further configured to search for, according to a currently stored routing rule between a dummy topic and an actual topic, the transmission path with the dummy topic corresponding to the publisher being the start point and the dummy topic corresponding to a random subscriber being the end point.

The input and output circuit 93 is further configured to, when the transmission path with the dummy topic corresponding to the publisher being the start point and the dummy topic corresponding to the subscriber being the end point is found, transmit the message or the identification information corresponding to the message on the found transmission path; and when the message or the identification information corresponding to the message is transmitted to the end point of each transmission path, send the message to the subscriber corresponding to the end point of the transmission path.

The processor 91 is further configured to, if the actual topic that matches the semantic parsing result is not found, create a new actual topic, and generate and store a routing rule between the dummy topic corresponding to the publisher and the newly-created actual topic.

The processor 91 is further configured to determine whether the obtained message is a control message, where the control message is used to update the stored routing rule between the dummy topic and the actual topic; if the obtained message is not a control message, perform a step of searching for, according to the currently stored routing rule between the dummy topic and the actual topic, the transmission path with the dummy topic corresponding to the publisher being the start point and the dummy topic corresponding to a random subscriber being the end point; and if it is determined that the obtained message is a control message, modify the stored routing rule between the dummy topic and the actual topic according to the control message.

The memory 92 is further configured to store the modified routing rule between the dummy topic and the actual topic.

The processor 91 is further configured to generate the identification information corresponding to the message; transmit, according to all found transmission paths, the identification information corresponding to the message; and when the identification information corresponding to the message is transmitted to the end point of each transmission path, obtain the message corresponding to the identification information, and send the message corresponding to the identification information to the subscriber corresponding to the end point of the transmission path.

The input and output circuit 93 is further configured to obtain a message that a subscriber sends to a dummy topic corresponding to the subscriber.

The processor 91 is further configured to create, according to the obtained message, a routing rule between the dummy topic corresponding to the subscriber and a target actual topic, and the target actual topic is an actual topic that is currently subscribed to by the subscriber, where the dummy topic is configured to forward a message between the actual topic and a publisher or forward a message between the actual topic and the subscriber, and the target actual topic is configured to forward a message between dummy topics corresponding to the subscriber.

The processor 91 is further configured to, when the obtained message is a control message, obtain the target actual topic according to the control message, where the control message is used to update a routing rule between the dummy topic and an actual topic that is selected by the subscriber; and create a routing rule between the dummy topic corresponding to the subscriber and the target actual topic that is obtained according to the control message.

The processor 91 is further configured to, when the obtained message is not a control message, perform semantic parsing on the obtained message, and search for, according to a semantic parsing result, an actual topic that matches the semantic parsing result in the stored actual topics; and if the actual topic that matches the semantic parsing result is found in the stored actual topics, create a routing rule between the dummy topic corresponding to the subscriber and the found actual topic that matches the semantic parsing result.

The processor 91 is further configured to, if the actual topic that matches the semantic parsing result is not found in the stored actual topics, create a new actual topic, and create a routing rule between the dummy topic corresponding to the subscriber and the new actual topic.

Figure 22:
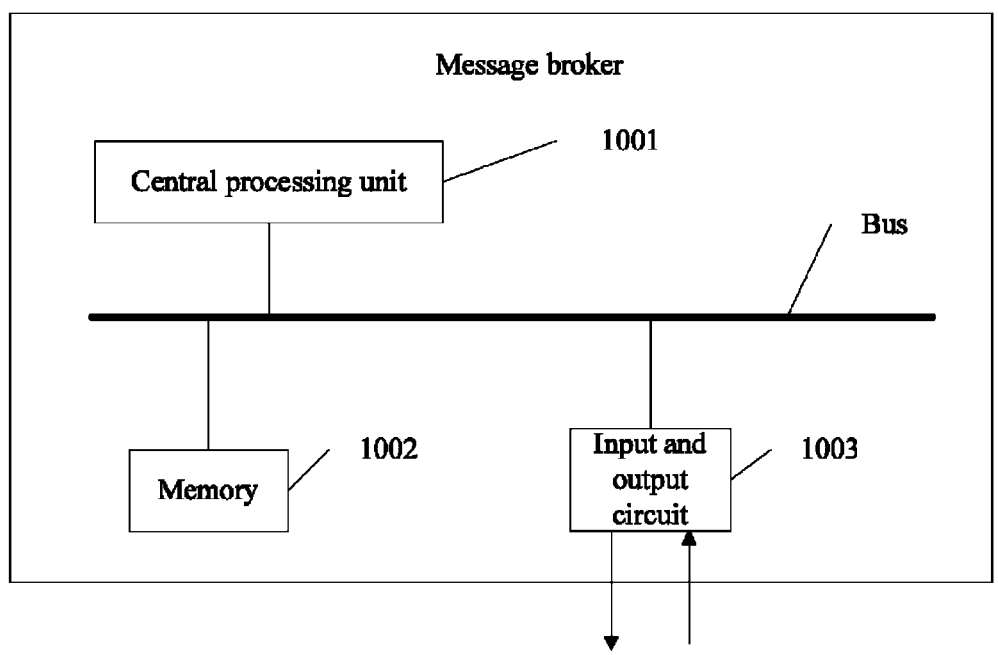
FIG. 22 is a composition block diagram of another message broker according to an embodiment of the present invention.

An embodiment of the present invention further provides a message broker, as shown in FIG. 22, including at least a processor 1001, a memory 1002, and an input and output circuit 1003. The memory 1002 is configured with programming code, and the processor 1001 is configured to invoke the programming code in the memory 1002 to implement a flow of a message publishing and subscribing method shown in FIG. 9 to FIG. 12. The memory 1002 communicates with the processor 1001 using a bus.

The processor 1001 is configured to obtain a message sent by a publisher; perform semantic parsing on the obtained message, and search for, according to a semantic parsing result, an actual topic that matches the semantic parsing result in stored actual topics; if the actual topic that matches the semantic parsing result is found, search for a subscriber corresponding to the actual topic in a stored subscription correspondence; and if the subscriber corresponding to the actual topic is found, send the obtained message to all found subscribers.

The processor 1001 is further configured to, if the actual topic that matches the semantic parsing result is not found, create a new actual topic, and store the newly-created actual topic.

The processor 1001 is further configured to obtain a message sent by a subscriber; perform semantic parsing on the obtained message, and search for, according to a semantic parsing result, an actual topic that matches the semantic parsing result in the stored actual topics; and if the actual topic that matches the semantic parsing result is found in the stored actual topics, create a subscription correspondence between the found actual topic and the subscriber.

The processor 1001 is further configured to if the actual topic that matches the semantic parsing result is not found in the stored actual topics, create a new actual topic, and create a subscription correspondence between the newly-created actual topic and the subscriber.

According to the foregoing description of the implementation manners, a person skilled in the art may clearly understand that the present invention may be implemented using software in combination with necessary common hardware, and certainly may also be implemented using hardware. However, in most cases, the former is a preferred implementation manner. Based on such an understanding, the technical solutions of the present invention essentially or the part contributing to the prior art may be implemented in a form of a software product. The software product is stored in a readable storage medium, such as a floppy disk, a hard disk or an optical disc of a computer, and includes several instructions for instructing a computer device (which may be a personal computer, a server, or a network device) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be topic to the protection scope of the claims.

What is claimed is:

1. A message publishing method, implemented by a message broker, on a computing device, that comprises at least one actual topic, comprising:

separately allocating, by the message broker, a dummy topic for each publisher and subscriber, wherein the dummy topic has functions of searching for a next-hop actual topic, wherein each actual topic has a logical connection with at least one dummy topic or at least one actual topic;

receiving, by using the dummy topic corresponding to a first publisher, a message from the first publisher;

searching for, according to a routing rule between the dummy topic corresponding to the first publisher and the at least one actual topic, the next-hop actual topic of the dummy topic corresponding to the first publisher;

determining, according to a routing rule of the next-hop actual topic, a next-hop topic of the next-hop actual topic;

transmitting the message to a subscriber corresponding to the dummy topic when the next-hop topic is the dummy topic; and repeating the determining step when the next-hop topic is an actual topic.

2. The method according to claim 1, further comprising:

performing semantic parsing on the message to obtain a semantic parsing result;

searching for, according to the semantic parsing result, an actual topic that matches the semantic parsing result in the at least one actual topic comprised in the message broker; and generating and storing a routing rule between the dummy topic corresponding to the first publisher and the found actual topic when the actual topic that matches the semantic parsing result is found.

3. The method according to claim 2, further comprising:

creating a new actual topic when the actual topic that matches the semantic parsing result is not found; and generating and storing a routing rule between the dummy topic corresponding to the publisher and the newly-created actual topic.

4. The method according to claim 1, further comprising:

obtaining a control message sent by the first publisher;

modifying a current routing rule between the dummy topic corresponding to the first publisher and the at least one actual topic comprised in the message broker according to the control message; and storing the modified routing rule.

5. The method according to claim 4, wherein the control message comprises a Forward instruction, a Copy instruction, a Subscription instruction, and a Proxy instruction.

6. A computing device, comprising:
   at least one actual topic;
   a memory configured to store computer program instructions; and
   a processor configured to execute the computer program instructions stored in the memory to perform the steps of:
   allocating a dummy topic for each publisher and subscriber, wherein the dummy topic has functions of searching for a next-hop actual topic and message forwarding, wherein each actual topic has a logical connection with at least one dummy topic or at least one actual topic;
   receiving, by using the dummy topic corresponding to a first publisher, a message from the first publisher;
   searching for, according to a routing rule between the dummy topic corresponding to the first publisher and the at least one actual topic, a next-hop actual topic of the dummy topic corresponding to the first publisher;
   determining, according to a routing rule of the next-hop actual topic, a next-hop topic of the next-hop actual topic;
   transmitting the message to a subscriber corresponding to the dummy topic when the next-hop topic is the dummy topic; and
   repeating the determining step when the next-hop topic is an actual topic.

7. The computing device according to claim 6, wherein the processor is further configured to perform the steps of:
   performing semantic parsing on the message to obtain a semantic parsing result;
   searching for, according to the semantic parsing result, an actual topic that matches the semantic parsing result in the at least one actual topic comprised in the message broker; and
   generating and storing a routing rule between the dummy topic corresponding to the first publisher and the found actual topic when the actual topic that matches the semantic parsing result is found.

8. The computing device according to claim 7, wherein the processor is further configured to perform the steps of:
   creating a new actual topic when the actual topic that matches the semantic parsing result is not found; and
   generating and storing a routing rule between the dummy topic corresponding to the publisher and the newly-created actual topic.

9. The computing device according to claim 6, wherein the processor is further configured to perform the steps of:
   obtaining a control message sent by the first publisher;
   modifying a current routing rule between the dummy topic corresponding to the first publisher and the at least one actual topic comprised in the message broker according to the control message; and
   storing the modified routing rule.

10. The computing device according to claim 9, wherein the control message comprises a Forward instruction, a Copy instruction, a Subscription instruction, and a Proxy instruction.

* * * * *